(12) United States Patent
Ogiwara et al.

(10) Patent No.: US 7,133,019 B2
(45) Date of Patent: Nov. 7, 2006

(54) ILLUMINATOR, IMAGE DISPLAY COMPRISING THE SAME, LIQUID CRYSTAL TELEVISION, LIQUID CRYSTAL MONITOR, AND LIQUID CRYSTAL INFORMATION TERMINAL

(75) Inventors: Akifumi Ogiwara, Osaka (JP); Yasunori Kuratomi, Kyungki-Do (KR); Junko Asayama, Osaka (JP); Kazunori Komori, Hyogo (JP)

(73) Assignee: Matsushita Electric Industrial Co., Ltd., Osaka (JP)

( * ) Notice: Subject to any disclaimer, the term of this patent is extended or adjusted under 35 U.S.C. 154(b) by 317 days.

(21) Appl. No.: 10/257,774

(22) PCT Filed: Apr. 20, 2001

(86) PCT No.: PCT/JP01/03384

§ 371 (c)(1),
(2), (4) Date: Mar. 11, 2003

(87) PCT Pub. No.: WO01/81992

PCT Pub. Date: Nov. 1, 2001

(65) Prior Publication Data
US 2003/0184690 A1    Oct. 2, 2003

(30) Foreign Application Priority Data
Apr. 21, 2000    (JP) ............................. 2000-120766

(51) Int. Cl.
*G09G 3/36*    (2006.01)

(52) U.S. Cl. ...................... 345/102; 349/117; 349/118
(58) Field of Classification Search ............... 345/102; 349/117, 118, 94, 123, 128, 132
See application file for complete search history.

(56) References Cited

U.S. PATENT DOCUMENTS

| | | | | |
|---|---|---|---|---|
| 4,652,932 A | * | 3/1987 | Miyajima et al. | 348/794 |
| 5,877,829 A | * | 3/1999 | Okamoto et al. | 349/74 |
| 5,883,685 A | * | 3/1999 | Mazaki et al. | 349/117 |
| 5,917,565 A | * | 6/1999 | Suzuki | 349/65 |
| 6,504,592 B1 | * | 1/2003 | Takatori et al. | 349/129 |
| 6,517,914 B1 | * | 2/2003 | Hiraishi | 428/1.1 |

FOREIGN PATENT DOCUMENTS

| | | |
|---|---|---|
| EP | 0 939 273 A1 | 9/1999 |
| JP | 2-29684 | 1/1990 |
| JP | 5-50431 | 7/1993 |
| JP | 8-101312 | 4/1996 |
| JP | 9-230144 | 9/1997 |
| JP | 9-230346 | 9/1997 |
| JP | 11-271759 | 10/1999 |

\* cited by examiner

*Primary Examiner*—Sumati Lefkowitz
*Assistant Examiner*—Ke Xiao
(74) *Attorney, Agent, or Firm*—McDermott Will & Emery LLP

(57) ABSTRACT

The invention provides an image display apparatus (1) comprising a lighting system (100); a LCD element (304); and an actuating means for varying the transmittance of the LCD element (304) according to image signals, wherein the LCD element (304) is designed such that when the angle of view with respect to a specified direction of a screen varies provided that the entire LCD element (304) is in a white display mode, transmittance varies such that it has peak values at viewing angles other than viewing angles in the vicinity of 0 degree, and wherein the lighting system (100) is designed such that the intensities of light beams emitted in the directions of the viewing angles in the vicinity of 0 degree are higher than the intensities of light beams emitted in the directions of the viewing angles at which the transmittance has a peak value.

20 Claims, 10 Drawing Sheets

ILLUMINATOR, IMAGE DISPLAY COMPRISING THE SAME, LIQUID CRYSTAL TELEVISION, LIQUID CRYSTAL MONITOR, AND LIQUID CRYSTAL INFORMATION TERMINAL

TECHNICAL FIELD

The present invention relates to a lighting system, as well as an image display apparatus, liquid crystal television, liquid crystal monitor and liquid crystal data terminal unit using the same.

BACKGROUND ART

A liquid crystal display (LCD), which is one example of image display apparatuses, is comprised of a LCD element; a backlight positioned under the LCD element, for feeding light to the LCD element; and a circuit board or the like for actuating the LCD element. In the LCD element, an electrode, alignment layer etc. formed from, for example, a transparent conductive thin film are laminated on two transparent glass substrates; the glass substrates are opposed with a specified spacing between such that their laminated surfaces face each other; a liquid crystal is confined between the two glass substrates; and a polarizing plate is disposed outside both glass substrates.

FIG. 10 shows a conventional backlight of the edge light type. The backlight 500 comprises an optical waveguide 503 constituted by a transparent synthetic resin plate which guides light incident on its end faces in a direction parallel with its main faces and allows the light to leave from one of the main faces; fluorescent tubes 501 each of which is a light source disposed in the vicinity of an end face 503a of the optical waveguide 503 so as to extend substantially in parallel with the end face 503a; reflecting covers 502 each of which covers the substantially entire length of a fluorescent tube 501; a diffusion sheet (not shown) positioned on the upper face (i.e., upper main face) of the optical waveguide 503, for diffusing light coming from the optical waveguide 503; and a reflecting sheet (not shown) positioned on the lower face (i.e., lower main face) of the optical waveguide 503, for upwardly reflecting light coming from the optical waveguide 503.

In the backlight 500 of such a structure, light beams emanated from the light source 501 are guided by the optical waveguide 503 away from the light source 501 with some light beams being reflected by the reflection sheet such that they go out of the optical waveguide 503 through its upper face. The outgoing light beams are diffused by the diffusion sheet to enter the LCD element (not shown). As a result, the whole LCD element is uniformly irradiated by the light beams.

Recently, there have been increasing demands for lightweight thin LCDs. To meet the demands, edge light type backlights are widely used in which a tubular light source such as cold cathode tubes is placed on the end faces of a LCD. In the field of LCDs for use in monitors and similar apparatuses, technology for producing high-fineness and high-brightness LCDs has been progressing. For achieving increased brightness with a view to coping with such a trend, it is necessary to increase the output of the cold cathode tubes or use more cold cathode tubes.

If more cold cathode tubes are used, the volume of the cold cathode tubes increases with the result that the region occupied by the light source becomes larger. If a cold cathode tube having increased output is employed, difficulties are encountered in producing thin LCDs because the size of a cold cathode tube increases as its output increases. Further, there are restrictions on electric power consumption, and therefore the output of the light source cannot be increased without careful consideration.

As liquid crystals used for LCDs, the Twisted Nematic (TN) Mode, In-Plane Switching (IPS) Mode, and Vertical Alignment (VA) Mode are known. In recent years, the Optically Compensated Birefringence (OCB) Mode which enables high speed switching is well known. Optical modulation properties vary depending on these liquid crystal modes. For example, viewing angle transmittance, which is an important factor when a LCD is viewed from various angles, usually decreases as a viewing axis departs from the center of a LCD in a direction toward either end of the LCD, that is, as the viewing angle increases. Herein, "viewing angle" means the angle between a viewing axis and a normal line of a liquid crystal panel, whereas "viewing angle transmittance" means the transmittance of a liquid crystal panel obtained at a viewing angle.

In addition, the viewing angle brightness of a backlight drops as the viewer's eyes are directed to a peripheral edge of the screen. Accordingly, when the viewer's eyes move off the center of the screen to an edge of the screen, the brightness seems to gradually decrease to the viewer. Herein, "viewing angle brightness" means the brightness obtained at a certain viewing axis angle with respect to a normal line of the main faces of the optical waveguide of a backlight.

With the OCB mode among the above liquid crystal modes, the viewing angle transmittance varies such that it becomes greater at the edges of the screen than at the center of the screen. In this case, there is the problem that when the viewer's eyes move from the center toward an edge of the screen of the LCD, the brightness increases with its peak in a certain region so that images appear awkward.

DISCLOSURE OF THE INVENTION

The invention is directed to solving the foregoing problems and a first object of the invention is therefore to provide an image display apparatus, liquid crystal television, liquid crystal monitor and liquid crystal data terminal unit which are capable of providing an improved brightness distribution for viewing angles.

A second object of the invention is to provide a lighting system capable of increasing brightness, and an image display apparatus, liquid crystal television, liquid crystal monitor and liquid crystal data terminal unit which employ the above lighting system.

These objects can be accomplished by an image display apparatus comprising a lighting system for emitting light; a LCD element for displaying images by allowing a liquid crystal layer which constitutes a screen to transmit light coming from the lighting system with varied transmittance; and actuating means for varying the transmittance of the LCD element according to image signals, wherein the LCD element is designed such that when the angle of view with respect to a specified direction of the screen varies, provided that the LCD element is in a white display mode entirely, the transmittance varies so as to have peak values at viewing angles other than viewing angles in the vicinity of 0 degree, and wherein the lighting system is designed such that the intensities of light beams emitted in the directions of the viewing angles in the vicinity of 0 degree are higher than the intensities of light beams emitted in the directions of the viewing angles at which the transmittance has a peak value.

With this arrangement, the viewing angle-transmittance characteristic of a LCD element in which the transmittance peaks at viewing angles other than angles in the vicinity of 0 degree is offset by the light distribution characteristic of the lighting system in which the intensities of light beams emitted in the directions of the viewing angles in the vicinity of 0 degree are higher than the intensities of light beams emitted in the directions of the viewing angles at which the transmittance peaks, so that an unnatural brightness distribution for viewing angles can be corrected.

In this case, when the angle of view varies with respect to the specified direction of the screen, brightness has its peak value at a viewing angle of substantially 0 degree.

With the above arrangement, a natural brightness distribution for viewing angles can be ensured, resulting in achievement of a LCD having natural visibility.

In this case, by scattering light beams which have been emitted in a certain direction, the intensities of light beams emitted in the directions of the viewing angles in the vicinity of 0 degree may be made to be higher than the intensities of light beams emitted in the directions of the viewing angles at which the transmittance has a peak value.

This enables a configuration in which the intensity of light emitted in a desired direction can be increased with a simple arrangement.

In this case, the lighting system may perform the aforesaid scattering by use of a scattering anisotropic film which scatters light beams coming from angles within a specified range while transmitting light beams coming from other angles than the angles within the specified range.

This enables a configuration in which light coming from a specific direction can be scattered with a simple arrangement.

In the above case, the lighting system may be designed such that outgoing light beams are collected in the directions of the viewing angles in the vicinity of 0 degree, thereby making the intensities of light beams going out in the aforesaid directions higher than the intensities of light beams going out in the directions of the viewing angles at which the transmittance has a peak value.

This makes it possible to obtain a configuration in which the intensity of light going out in a specific direction can be increased with a simple arrangement.

In this case, the lighting system may be designed such that the aforesaid light condensation is carried out by use of a prism sheet for collecting incoming light to send in a certain direction.

This enables a configuration in which incoming light is collected so as to be sent in a specific direction with a simple arrangement.

In this case, the LCD element may be designed such that the transmittance varies so as to have peak values within the viewing angle range of from minus 60 degrees to minus 30 degrees and within the viewing angle range of plus 30 degrees to plus 60 degrees.

This allows the invention to be applicable to OCB liquid crystal mode LCDs.

In this case, the alignment direction of liquid crystal molecules in the liquid crystal layer of the LCD element may be asymmetrical with respect to a vertical direction and lateral direction of the screen.

An OCB mode LCD element may be used as the above LCD element.

With this arrangement, the brightness distribution with respect to viewing angles of an OCB liquid crystal mode LCD can be improved.

In this case, the above specified direction of the screen may be perpendicular to a rubbing direction for aligning the liquid crystal molecules of the liquid crystal layer.

Since the unnatural brightness distribution with respect to viewing angles of the OCB liquid crystal mode occurs in a direction perpendicular to the rubbing direction, it can be corrected with the above arrangement.

In the above case, the above specified direction may be a lateral direction of the screen.

With this arrangement, the viewing angle in the lateral direction of the screen can be widened, compared to the viewing angle in the vertical direction of the screen.

According to the invention, there is provided a lighting system comprising an optical waveguide designed to allow light entering through its end faces to go out through one of its main faces; and light sources disposed alongside the end faces of the optical waveguide respectively, for emitting light so as to be incident on the end faces, wherein the end faces of the optical waveguide on which the light from the light sources is incident are formed so as to be diagonal with respect to the main faces of the optical waveguide.

With this arrangement, the area of the entrance faces for the light coming from the light sources increases compared to the case where the end faces of the optical waveguide are at right angles to the main faces, so that the rate of utilization of the light of the light source is improved. As a result, the brightness of the lighting system can be increased without increasing the thickness of the optical waveguide.

According to the invention, there is provided a lighting system comprising an optical waveguide designed to allow light entering through its end faces to go out through one of its main faces; and light sources disposed alongside the end faces of the optical waveguide respectively, for emitting light so as to be incident on the end faces, wherein each light source includes a plurality of elongated arc tubes which are arranged at different distances from their associated end face; and a reflecting member for reflecting light coming from the plurality of arc tubes to the associated end face of the optical waveguide.

According to the invention, there is provided a lighting system comprising an optical waveguide designed to allow light entering through its end faces to go out through one of its main faces; and light sources disposed alongside the end faces of the optical waveguide respectively, for emitting light so as to be incident on the end faces, wherein each light source includes a plurality of elongated arc tubes which have different girths and are placed alongside their associated end face of the optical waveguide; and a reflecting member for reflecting light coming from the plurality of arc tubes to the associated end face of the optical waveguide.

With this arrangement, the percentage of interception of the light, which has been emitted from a thicker arc tube and reflected off the reflecting member, decreases, because the other arc tubes are thin. Therefore, the rate of utilization of the light of each light source is improved, resulting in an increase in the brightness of the lighting system.

In this case, the thinnest one of the plurality of arc tubes may be disposed at a position closer to the associated end face than others.

With this arrangement, the amount of light directed from the thinner arc tube to the end face of the optical waveguide increases, so that the rate of utilization of the light of the light source increases, further increasing the brightness of the light emanated from the lighting system.

According to the invention, there is provided an image display apparatus comprising:

a lighting system comprising an optical waveguide designed to allow light entering through its end faces to go out through one of its main faces, and light sources disposed alongside the end faces of the optical waveguide respectively, for emitting light so as to be incident on the end faces, wherein the end faces of the optical waveguide on which the light from the light sources is incident are formed so as to be diagonal with respect to the main faces of the optical waveguide;

an image display element for displaying images by allowing an optical modulator which constitutes a screen to transmit light coming from the lighting system with varied transmittance; and actuating means for varying the transmittance of the image display element according to image signals.

This enables an image display apparatus having increased brightness.

According to the invention, there is provided an image display apparatus comprising:

a lighting system comprising an optical waveguide designed to allow light entering through its end faces to go out through one of its main faces, and light sources disposed alongside the end faces of the optical waveguide respectively, for emitting light so as to be incident on the end faces, wherein each light source includes a plurality of elongated arc tubes which are arranged at different distances from their associated end face and a reflecting member for reflecting light coming from the plurality of arc tubes to the associated end face of the optical waveguide;

an image display element for displaying images by allowing an optical modulator which constitutes a screen to transmit light coming from the lighting system with varied transmittance; and actuating means for varying the transmittance of the image display element according to image signals.

According to the invention, there is provided an image display apparatus comprising:

a lighting system comprising an optical waveguide designed to allow light entering through its end faces to go out through one of its main faces, and light sources disposed alongside the end faces of the optical waveguide respectively, for emitting light so as to be incident on the end faces, wherein each light source includes a plurality of elongated arc tubes which have different girths and are placed alongside their associated end face of the optical waveguide and a reflecting member for reflecting light coming from the plurality of arc tubes to the associated end face of the optical waveguide;

an image display element for displaying images by allowing an optical modulator which constitutes a screen to transmit light coming from the lighting system with varied transmittance; and actuating means for varying the transmittance of the image display element according to image signals.

This enables an image display apparatus having increased brightness.

In this case, the thinnest one of the plurality of arc tubes in the lighting system is disposed at a position closer to the associated end face than others.

This also enables an image display apparatus having increased brightness.

In the above case, the image display element may consist of a LCD element which uses a liquid crystal layer as the optical modulator, whereby a LCD is constructed.

This enables an image display apparatus having more increased brightness.

According to the invention, there is provided a liquid crystal television comprising the image display apparatus described in claim 1 and a tuner for selecting a channel of TV broadcast signals, wherein the TV picture signals corresponding to the channel which has been selected by the tuner are input to the actuating means of the image display apparatus as the image signals.

With this arrangement, a liquid crystal television having an improved brightness distribution with respect to viewing angles can be attained.

According to the invention, there is provided a liquid crystal monitor comprising the image display apparatus described in claim 1, and a signal processing unit for processing monitor signals, wherein monitor picture signals output from the signal processing unit are input to the actuating means of the image display apparatus as the image signals.

This provides a liquid crystal monitor having an improved brightness distribution with respect to viewing angles.

According to the invention, there is provided a liquid crystal data terminal unit comprising the image display apparatus described in claim 1 and data receiving means for receiving communication data, wherein image signals including required data output from the data receiving means are input to the actuating means of the image display apparatus as the image signals.

This provides a liquid crystal data terminal unit having an improved brightness distribution with respect to viewing angles.

According to the invention, there is provided a liquid crystal television comprising the image display apparatus described in any one of claims 16 to 18 and a tuner for selecting a channel of TV broad cast signals, wherein the image display element of the image display apparatus consists of a LCD element which uses a liquid crystal layer as the optical modulator and wherein the TV picture signals corresponding to the channel which has been selected by the tuner are input to the actuating means of the image display apparatus as the image signals.

This enables a liquid crystal television having increased brightness.

According to the invention, there is provided a liquid crystal monitor comprising the image display apparatus described in any one of claims 16 to 18 and a signal processing unit for processing monitor signals, wherein the image display element of the image display apparatus consists of a LCD element which uses a liquid crystal layer as the optical modulator and wherein monitor picture signals output from the signal processing unit are input to the actuating means of the image display apparatus as the image signals.

This provides a liquid crystal monitor having increased brightness.

According to the invention, there is provided a liquid crystal data terminal unit comprising the image display apparatus described in any one of claims 16 to 18 and data receiving means for receiving communication data, wherein the image display element of the image display apparatus consists of a LCD element which uses a liquid crystal layer as the optical modulator and wherein image signals including required data output from the data receiving means are input to the actuating means of the image display apparatus as the image signals.

With this arrangement, a liquid crystal data terminal unit having increased brightness can be obtained.

These objects as well as other objects, features and advantages of the invention will become clear from the following detailed description of preferred embodiments with reference to the accompanying drawings.

BRIEF DESCRIPTION OF THE DRAWINGS

FIGS. 4(a) and 4(b) show a configuration and function of an image display apparatus according to a third embodiment of the invention, FIG. 4(a) being a sectional view diagrammatically illustrating the configuration of the image display apparatus whereas FIG. 4(b) is a sectional view illustrating the function of a scattering anisotropic film incorporated in the image display apparatus shown in FIG. 4(a).

FIGS. 5(a) and 5(b) show one example of the structure of the scattering anisotropic film shown in FIG. 4(b), FIG. 5(a) being a plan view whereas FIG. 5(b) is a sectional view taken along line Vb—Vb of FIG. 5(a).

FIGS. 6(a) to 6(c) are graphs for explaining changes in the brightness with respect to viewing angles of LCDs, wherein FIG. 6(a) is a graph showing changes in the light transmittance with respect to viewing angles of a LCD, FIG. 6(b) is a graph showing changes in the brightness with respect to viewing angles of a LCD according to a comparative example and FIG. 6(c) is a graph showing changes in the brightness with respect to viewing angles of a LCD according to Example 3 of a third embodiment of the invention.

FIGS. 7(a) and 7(b) show a configuration and function of an image display apparatus according to a fourth embodiment of the invention, FIG. 7(a) being a sectional view diagrammatically illustrating the configuration of the image display apparatus whereas FIG. 7(b) is a sectional view illustrating the function of a prism sheet incorporated in the image display apparatus shown in FIG. 7(a).

BEST MODE FOR CARRYING OUT THE INVENTION

Figure 1:
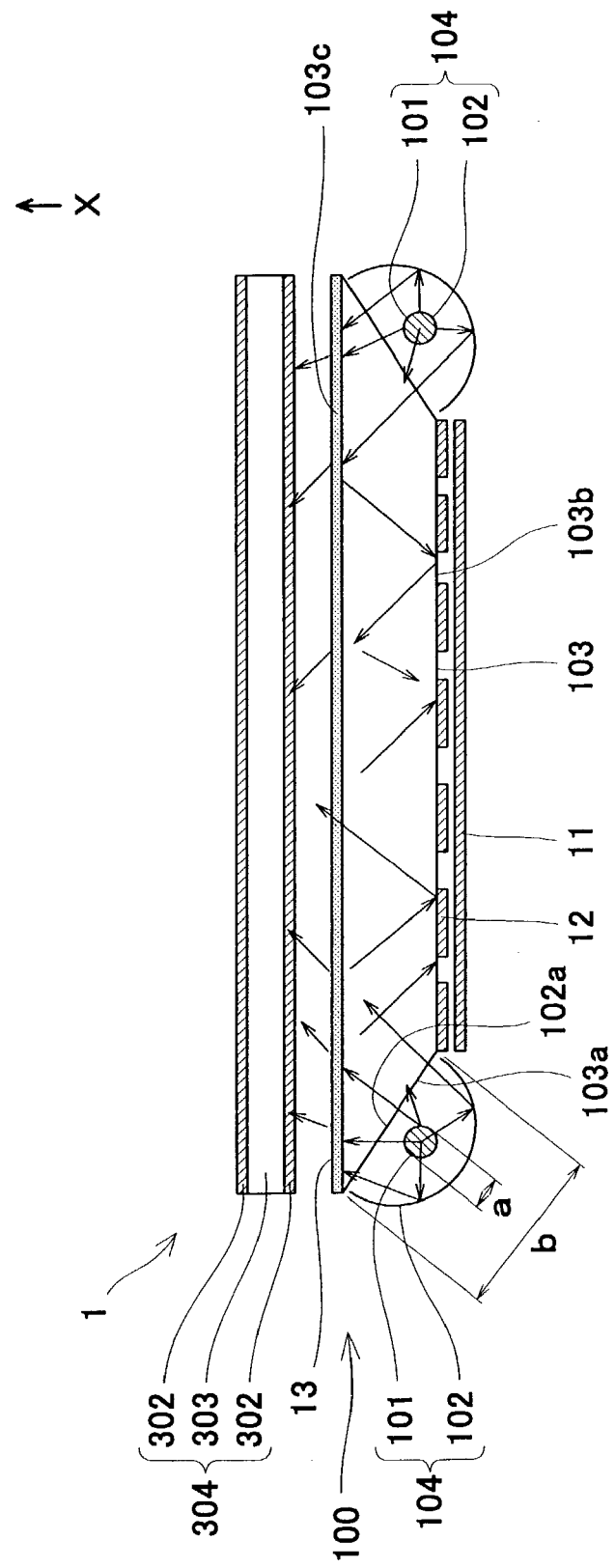
FIG. 1 is a sectional view diagrammatically illustrating a configuration of a lighting system and image display apparatus according to a first embodiment of the invention.

Referring now to the drawings, preferred embodiments of the invention will be described below.

First Embodiment

The first embodiment of the invention is associated with one example of the configuration of the lighting system capable of providing increased brightness and image display apparatus.

(Lighting System)

FIG. 1 is a sectional view diagrammatically illustrating the configuration of the lighting system and image display apparatus according to the first embodiment. In this figure, the upward direction of the image display apparatus is represented by X direction for the sake of simplicity.

FIG. 1 associated with the first embodiment exemplifies a LCD 1 as the image display apparatus and a backlight 100 for use in a LCD as the lighting system.

The backlight 100 is disposed under a liquid crystal panel (hereinafter referred to as "LCD element") 304 which constitutes the LCD element 1 together with the backlight 100. The backlight 100 is composed of an optical waveguide 103 made of a transparent rectangular synthetic resin plate; arc tubes 101 which are a pair of light emitters disposed alongside the vicinity of a pair of end faces 103a of the optical waveguide 103 and substantially parallel with the end faces 103a, respectively; a pair of reflectors 102 for covering the entire lengths of the pair of arc tubes 101 respectively; a diffusion sheet 13 placed on the upper face 103c of the optical waveguide 103, for diffusing light from the optical waveguide 103; and a reflecting board 11 disposed under the optical waveguide 103. Each arc tube 101 and each reflector 102 constitute a light source 104. On the lower face 103b of the optical waveguide 103, a specified dot pattern 12 for reflecting incident light is formed so as to cause changes in density. The dot pattern 12 is made by printing a white coating material or the like. The end faces 103a of the waveguide 103 near which the arc tubes 101 are respectively disposed are so formed as to be diagonal relative to the main faces 103b, 103c.

In the backlight 100 thus formed, light beams emitted from the arc tubes 101 enter the optical waveguide 103 through the end faces 103a. The incident light beams are subjected to multiple scattering within the optical waveguide 103 so that they go out of the optical waveguide 103, passing through the entire upper face 103c. At that time, the light beams incident on the dot pattern 12 and the light beams which have entered the reflecting board 11, deflecting from the dot pattern 12 are reflected by the dot pattern 12 and the reflecting board 11 respectively so that they return to the optical waveguide 103. The light beams going out of the optical waveguide 103 are diffused by the diffusion sheet 13 so as to enter on the LCD element 304. As a result, the entire LCD element 304 is uniformly irradiated by light.

Next, the effect of the present embodiment will be explained. It is important for the improvement of the rate of light utilization of the backlight 100 to make light from the light source 104 enter the optical waveguide 103 as much as possible. The light beams going from the light source 104 into the optical waveguide 103 are classified into two types, that is, the light beams coming into the optical waveguide 103 directly from the arc tubes 101 and the light beams coming into the optical waveguide 103 after being reflected off the reflectors 102 disposed behind the arc tubes 101. Some of the light beams reflected by the reflectors 102 are interrupted by the arc tubes 101 so that they cannot reach the optical waveguide 103.

Generally, in the structures of the edge light type backlights, light comes into the optical waveguide 103 from its end faces. Therefore, the length of the minor axis of the entrance faces for the light beams coming into the optical waveguide 103 from the light sources 104 is limited by the thickness of the optical waveguide 103. For effective entrance of light beams, the area of the entrance faces should be increased. However, as the thickness of the waveguide 103 increases, the whole size of the backlight 100 increases, resulting in an increase in the weight of the backlight 100.

Now, suppose that the entrance faces of the optical waveguide 103 are formed in a diagonal shape as shown in FIG. 1. In this case, it is conceivable that the percentage of reflected light from the reflectors 12 which enters the optical waveguide 103 is proportional to the ratio (b/a) of the diameter b of the reflectors to the diameter a of the arc tubes 101 shown in FIG. 1. Therefore, if light beams enter the optical waveguide 103 from directions diagonal with respect to the main faces 103b, 103c as shown in FIG. 1, the area of the entrance faces can be increased without changing the thickness of the optical waveguide 103 so that the light from the light sources 104 can effectively enter the optical waveguide 103. As a result, the rate of light utilization of the light sources 104 can be improved and therefore a brighter backlight 100 can be realized with the light sources 104 having the same output power. Additionally, it is also possible for the backlight 100 to attain the same brightness as that of the conventional backlight with less power consumption.

EXAMPLE 1

Example 1 of the invention is associated with a backlight. The backlight of Example 1 will be explained by comparison with a comparative example.

In both Example 1 and the comparative example, a rectangular optical waveguide having 7-inch long diagonal lines and a thickness of about 10 mm was used as the optical waveguide 103, and cold cathode tubes having an output of about 100 W were used as the arc tubes 101.

In the comparative example, the end faces of the optical waveguide 103 for light entrance (hereinafter referred to as "light entrance end faces") are perpendicular to the main faces like the prior art. When the brightness of light going out of the upper face of the optical waveguide was measured, it was found to be about 4,500 to 5,000 candela.

Then, the light entrance end faces 103a of the optical waveguide 103 were cut at 45 degrees to the main faces, thereby preparing the optical waveguide 103 of Example 1. Further, the reflectors 102 each having a light exit face 102a fitted to an end face 103a of the optical waveguide 103 were used. When measuring the brightness of light going out of the optical waveguide 103 through its upper face, it was found to be about 6,500 to 7,000 candela. Concretely, the brightness of the backlight in Example 1 was about 40 to 44 percent higher than that of the prior art (comparative example).

As described earlier, the cross section of the optical waveguide 103 is made to have diagonal portions as shown in FIG. 1, whereby the percentage of light which enters the optical waveguide 103 from the light sources 104 can be increased. As a result, the brightness of the backlight 100 of Example 1 has proved to be increasable by about 1.4 times that of the prior art.

(Image Display Apparatus)

Figure 2:
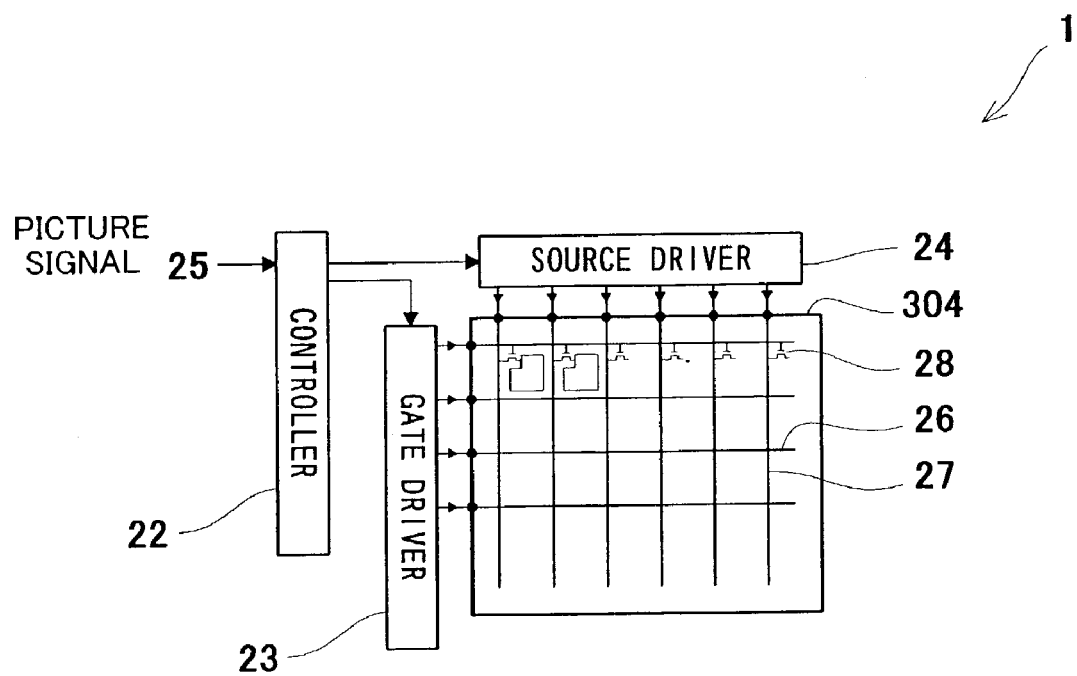
FIG. 2 is a block diagram showing a configuration of a LCD serving as the image display apparatus of the first embodiment of the invention.

FIG. 2 is a block diagram showing a configuration of a LCD which serves as the image display apparatus of the present embodiment.

Referring to FIG. 1 in conjunction with FIG. 2, the backlight 100 is disposed under the LCD element 304 in the LCD 1 of the present embodiment. The LCD element 304 is designed such that polarizing plates 302 are attached to both sides of a liquid crystal cell 303. The liquid crystal cell 303 is of the known TFT (Thin Film Transistor) type. It comprises an opposed substrate (not shown) having a common electrode (not shown) formed on the inner face thereof; and a TFT substrate (not shown) having pixel electrodes (not shown), gate lines 26, source lines 27 and switching elements 28 which are formed on the inner face thereof, the opposed substrate and the TFT substrate being opposed to each other with a liquid crystal (not shown) between.

In the TFT substrate, the gate lines 26 and the source lines 27 are arranged in matrix form and every region defined by the gate lines 26 and the source lines 27 is provided with a pixel electrode and a switching element 28. The source lines 27 and gate lines 28 of the LCD element 304 are actuated by a source driver 24 and a gate driver 23 respectively, and the source driver 24 and the gate driver 23 are controlled by a controller 22.

In the LCD element 1 thus formed, the controller 22 outputs a control signal to the gate driver 23 and to the source driver 24 in accordance with a picture signal 25 input from outside. In response to the control signal, the gate driver 23 outputs a gate signal to the gate lines 26, sequentially turning the respective switching elements 28 of the pixels ON. In timing with this, the source driver 24 sequentially supplies a picture signal to the respective pixel electrodes of the pixels through the source lines 27. As a result, the liquid crystal is modulated and the transmittance for the light emitted from the backlight 100 varies so that the picture corresponding to the picture signal 25 comes into the sight of the viewer who is watching the LCD 1. At that time, the brightness of the backlight 100 is increased compared to that of the prior art and therefore a brighter picture is attained. In addition, the same brightness as in the prior art can be obtained with less output power.

Second Embodiment

The second embodiment of the invention is associated with another example of the configuration of the lighting system capable of providing increased brightness.

Figure 3:
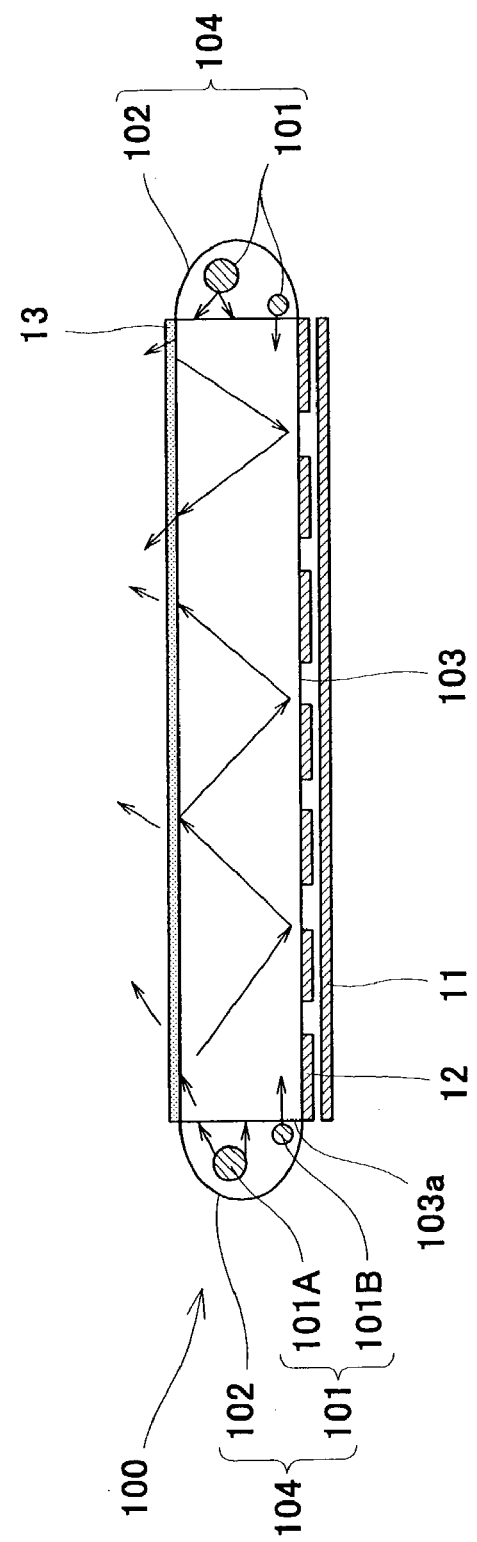
FIG. 3 is a cross sectional view diagrammatically illustrating a configuration of a backlight serving as a lighting system according to a second embodiment of the invention.

FIG. 3 is a sectional view diagrammatically illustrating a configuration of a backlight serving as the lighting system of the second embodiment. In FIG. 3, the same reference numerals as in FIG. 1 designate the same or equivalent parts.

As shown in FIG. 3, the second embodiment uses two arc tubes 101A, 101B as the light emitter 101 of a light source 104. Except this point, the second embodiment is similar to the first embodiment.

This configuration will be described in detail. In recent years, there have been developed configurations in which a plurality of arc tubes are used for the purpose of rendering a high-brightness backlight feasible. Generally, in this case, two arc tubes are aligned equidistantly from a light entrance end face of a waveguide so as to extend in parallel with the light entrance end face. However, this arrangement reveals such a drawback that as described in the first embodiment, the area of reflected light from the reflector which is intercepted by the arc tubes increases. In addition, some of light beams emitted from an arc tube cannot reach the reflector, being interrupted by the next arc tube. Accordingly, even though two arc tubes having the same output power are used, the brightness of the backlight cannot be doubled so that the rate of light utilization is low.

To solve this problem, the inventors have hit on the idea of use of two arc tubes 101A, 101B having different diameters as the light emitter 101 of the light source 104. The light entrance end faces 103a of the optical waveguide 103 are perpendicular to the main faces 103b, 103c similarly to the prior art. The arc tube 101B having smaller diameter is placed at a position closer to the light entrance end face 103a of the optical waveguide 103 than the other arc tube 101A. The arc tube 101A having larger diameter is disposed farther from the light entrance end face 103a such that the arc tube 101A does not overlap with the smaller-diameter arc tube 101B. In this arrangement, since the smaller-diameter arc tube 101B is closer to the light entrance end face 103a, the percentage of the light, which is interrupted by the front arc tube 101B, failing in entering the optical waveguide 103 after coming from the arc tube 101A directly or via the reflector 102, is reduced. Further, since the smaller-diameter arc tube 101B is closer to the optical waveguide 103, the percentage of the light, which directly enters the optical waveguide 103 without being reflected by the reflector 102, increases.

As described above, thanks to the arrangement of the arc tubes 101A, 101B shown in FIG. 3, the percentage of the light entering the optical waveguide 103 is increased so that the rate of light utilization can be improved.

EXAMPLE 2

Example 2 of the invention is associated with a backlight. The backlight of Example 2 will be described by comparison with a comparative example. In both Example 2 and the comparative example, an optical waveguide having the same size as that of Example 1 of the first embodiment was used. In the comparative example, two cold cathode tubes having a diameter of 2.5 mm and an output power of 100 W were aligned 5 mm away from a light entrance end face of the optical waveguide so as to be parallel with the light entrance end face. By measurement, the brightness of the light going out of the optical waveguide through its upper face was found to be 8,000 to 9,000 candela.

In Example 2, a cold cathode tube 101B having a diameter of 1.5 mm and an output power of 60 W and a cold cathode tube 101A having a diameter of 2.5 mm and an output power of 100 W were used as the light emitter 101, as shown in FIG. 3. The cold cathode tube 101B of a diameter of 1.5 mm was placed just in front of the light entrance end face 103a of the optical waveguide 103, whereas the other arc tube 101A was placed 5 mm away from the light entrance end face 103a. The diameter of each reflector 102 was the same as the thickness of the optical waveguide 103, namely, about 10 mm. When measuring the brightness of the light going out of the optical waveguide 103 through the upper face 103c, it was found to be about 9,000 to 10,000 candela. In the present example, the same level of brightness as in the prior art (comparative example) could be obtained in spite of the use of the light emitter 101 having lower output power than the prior art. Accordingly, it was found that a higher rate of light utilization than the prior art was ensured in the present example.

It is apparent that the light emitter 101 is not limited to the structure shown in FIG. 3 but other modifications are possible. For instance, three arc tubes having different diameters may be placed at different distances from a light entrance end face of the optical waveguide. It is also possible to employ a larger number of arc tubes having a wider variety of diameters, and these arc tubes may be further improved or modified.

Similarly to the first embodiment, the above backlight 100 may be used for constructing a LCD, thereby achieving a bright LCD.

Third Embodiment

The third embodiment of the invention is associated with one example of the configuration of the image display apparatus capable of providing an improved brightness distribution with respect to viewing angles.

Figure 4:
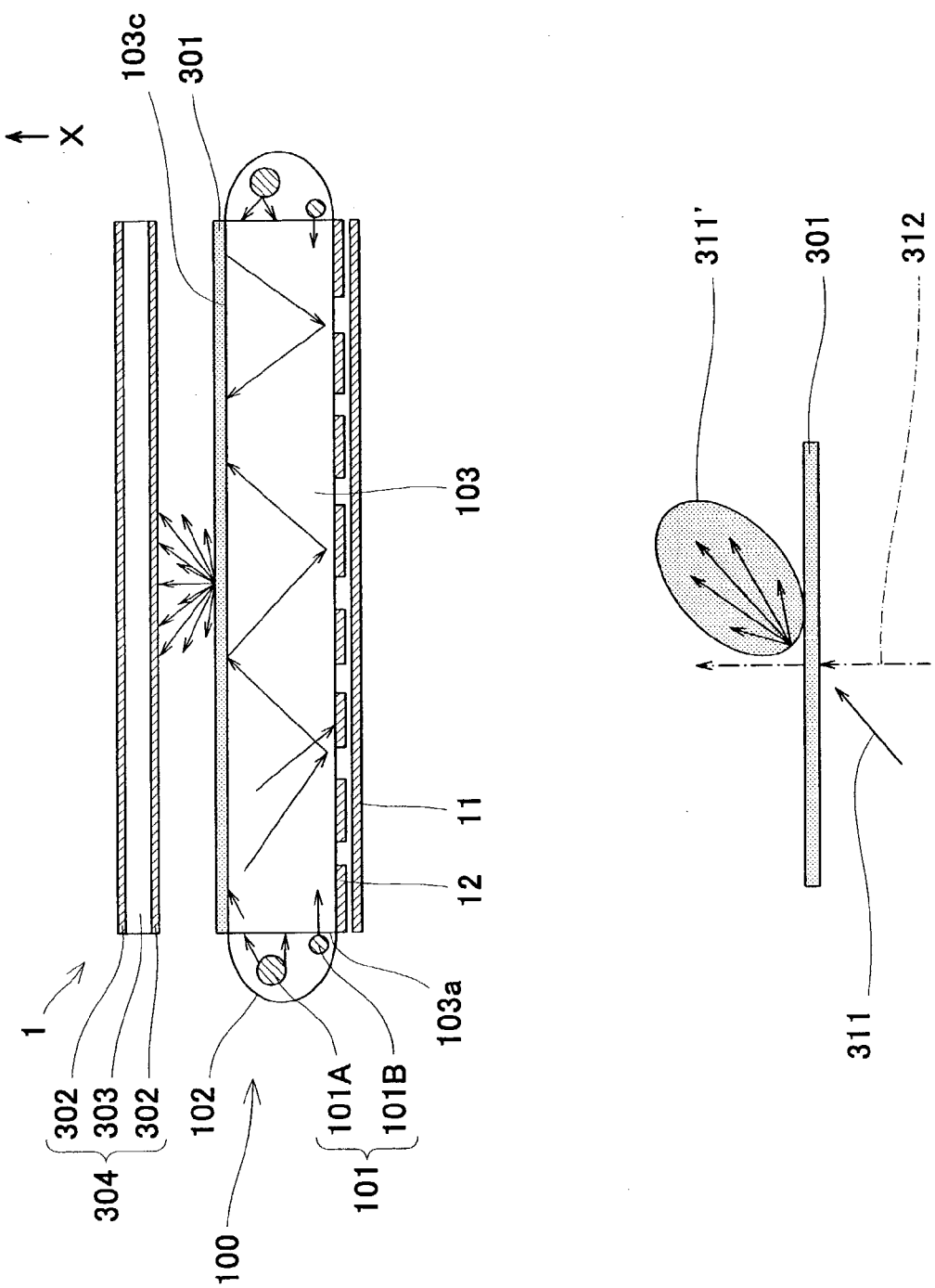

FIGS. 4(a) and 4(b) illustrate a configuration and function of the image display apparatus of the third embodiment, FIG. 4(a) being a sectional view diagrammatically showing the configuration of the image display apparatus whereas FIG. 4(b) is a sectional view diagrammatically showing the function of the scattering anisotropic film of the image display apparatus shown in FIG. 4(a). In FIG. 4, the same reference numerals as in FIGS. 1 and 3 designate the same or equivalent parts. In the third embodiment, a LCD 1 is exemplified as the image display apparatus.

As shown in FIG. 4(a), in the third embodiment, the hardware of the LCD 1 is constructed by use of the backlight 100 shown in FIG. 3, similarly to FIG. 1. It should be noted that the backlight 100 includes a scattering anisotropic film 301 in place of the diffusion sheet 13 shown in FIG. 3. The configuration of the control system of the LCD 1 is similar to that of FIG. 2.

The scattering anisotropic film 301 has such a characteristic that light 311 coming from a specified direction is scattered (311') as shown in FIG. 4(b) while lights 312 coming from other directions generally pass through the film 301.

Figure 5:
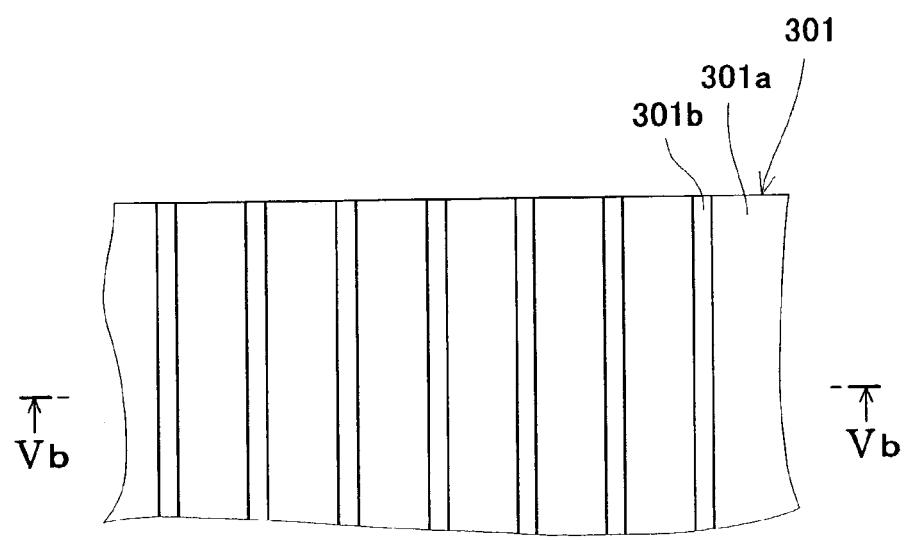
Figure 5:
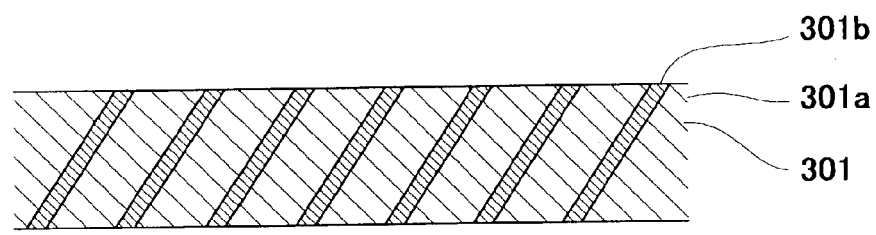

FIGS. 5(a) and 5(b) show one example of the structure of the scattering anisotropic film, wherein FIG. 5(a) is a plan view and FIG. 5(b) is a sectional view taken along line Vb—Vb of FIG. 5(a). As shown in FIG. 5, the scattering anisotropic film 301 is composed of two dielectric layers 301a, 301b having different indexes of refraction which are alternately disposed in an extending direction of the film 301 such that they are parallel with each other and inclined at a specified angle to the main faces. The angle of inclination and pitch of the two dielectric layers 301a, 301b are set such that they form a diffraction grating. With this arrangement, the scattering characteristic shown in FIG. 4(b) can be obtained. By selecting the indexes of refraction, angle of inclination, pitch etc. of the dielectric layers 301a, 301b, the incidence angle of the incident light to be scattered can be set to a desired value. Herein, the incidence angle of the incident light to be scattered is set to 60 degrees. The scattering anisotropic film 301 can be formed by projecting an ultraviolet ray having a light intensity pattern corresponding to the two dielectric layers 301a, 301b alternately placed as shown in FIG. 5(a) onto a film made from a UV cure resin in the angular direction shown in FIG. 5.

As the scattering anisotropic film 301, "Lumisty (registered trade name)" produced by Sumitomo Chemical Co., Ltd. may be used. "Lumisty (registered trade name)" is designed such that the incidence angle of incident light to be scattered is 60 degrees.

EXAMPLE 3

Example 3 of the invention is associated with a LCD. The LCD element of Example 3 will be explained by comparison with a comparative example. In both Example 3 and the comparative example, the OCB liquid crystal mode, which provided high response speed, was used as the liquid crystal cell 303 for the liquid crystal element 304. In the comparative example, the backlight prepared in Example 2 of the second embodiment was used as the backlight 100 without modification. Specifically, the diffusion sheet 13 was disposed on the upper face 103c of the optical waveguide 103. On the other hand, in Example 3, a backlight, which was similar to that of Example 2 of the second embodiment except that the scattering anisotropic film 301 was disposed on the upper face 103c of the optical waveguide 103 in place of the diffusion sheet 13, was used. Accordingly, the size of the optical waveguide 103 was 7 inches in both Example 3 and the comparative example.

Figure 6:
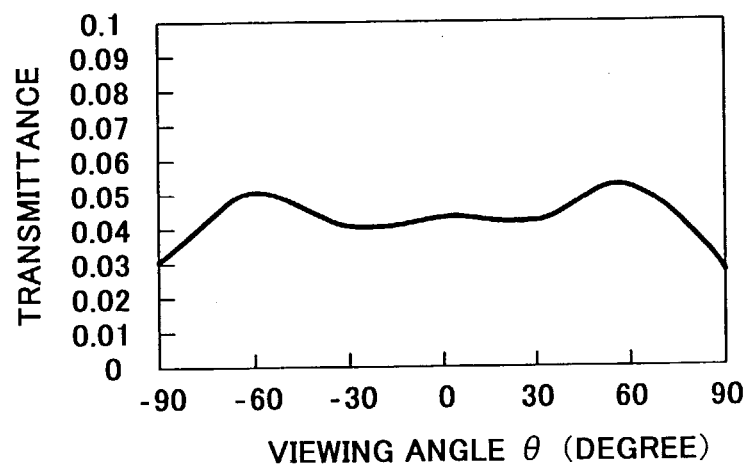
Figure 6:
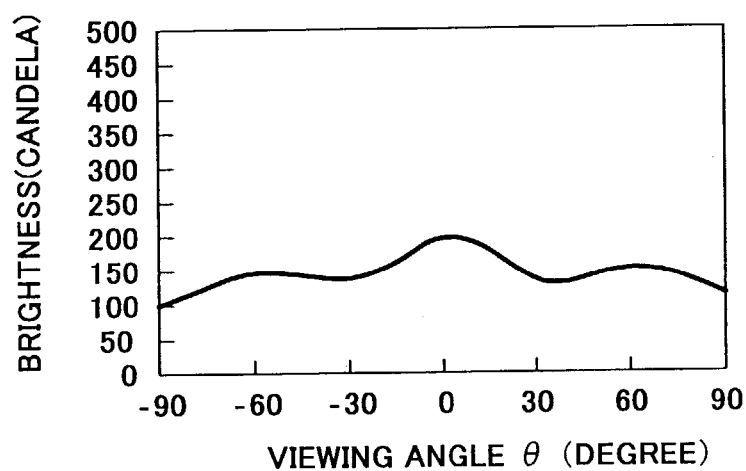
Figure 6:
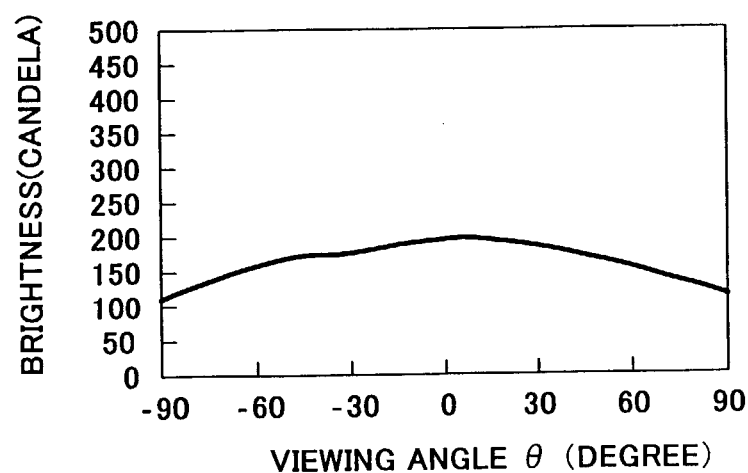

The result of a comparison between Example 3 and the comparative example will be explained. FIGS. 6(a) to 6(c) are graphs for explaining changes in the brightness with respect to viewing angles of LCDs, wherein FIG. 6(a) is a graph showing changes in the light transmittance with respect to viewing angles of a LCD, FIG. 6(b) is a graph showing changes in the brightness with respect to viewing angles of the LCD of the comparative example and FIG. 6(c) is a graph showing changes in the brightness with respect to viewing angles of the LCD according to Example 3.

When changes in the light transmittance with respect to viewing angles of the LCD element 304 in single form was measured, the result shown in FIG. 6(a) was obtained. According to FIG. 6(a), the transmittance varies so as to have its peaks at viewing angles of ±60 degrees. When the viewing angle is in the ranges of from −60 to −30 degrees and from +30 to +60 degrees, the transmittance having such peaks has higher values than the values of the transmittance when the viewing angle is in the vicinity of 0 degree. In the present embodiment, "viewing angle" means the viewing angle when the viewer moves his sight in a lateral direction of the screen of the LCD 1, that is, a direction perpendicular to the direction of rubbing for aligning the liquid crystal molecules of the liquid crystal cell 303 of the LCD 1. Such phenomenon does not occur in a vertical direction of the screen of the LCD 1 and, therefore, sight movement in a vertical direction is not a subject to which the invention is directed to.

When changes in the brightness with respect to viewing angles of the LCD of the comparative example was measured, the result shown in FIG. 6(b) was obtained. It can be understood from FIG. 6(b) that the brightness reaches a peak at a viewing angle of 0 degree and declines as the absolute value of the viewing angle increases. Then, the brightness reaches a peak again when the viewing angle is ±60 degrees. This is thought to be a reflection of the changes in the transmittance of the liquid crystal cell shown in FIG. 6(a). If a liquid crystal monitor having such a characteristic is actually observed, the brightness appears to increase once at only a certain viewing angle which is away from the center of the screen, so that the viewer sometimes has uncomfortable feeling.

When changes in the brightness with respect to viewing angles of the LCD of Example 3 was measured, the result shown in FIG. 6(c) was obtained. It is apparent from the comparison between the viewing angle—brightness curve of FIG. 6(c) and the viewing angle—brightness curve of FIG. 6(b) that the peak of the brightness shown in FIG. 6(b) disappears in the vicinity of viewing angles of ±60 degrees in FIG. 6(c). It can be further understood that, in the case of FIG. 6(c), as the absolute value of the viewing angle increases from 0 degree, the brightness gently drops and the range of viewing angles which provide high brightness is wider compared to the case shown in FIG. 6(b). The reason for this is as follows.

In Example 3, since the scattering anisotropic film 301 is formed on the upper face 103c of the optical waveguide 103 and the scattering anisotropic film 301 has a scattering characteristic relative to incident light beams which enter at incident angles in the vicinity of ±60 degrees, outgoing light beams leaving at angles in the vicinity of ±60 degrees are scattered by the scattering anisotropic film 301, resulting in reduced light intensity. The viewing angle—transmittance characteristic of the LCD element 304 in which transmittance varies so as to have peaks at viewing angles of ±60 degrees is thus offset by the characteristic of the scattering anisotropic film 301 which scatters incident light beams entering at incident angles in the vicinity of ±60 degrees.

The present embodiment has, accordingly, proved successful in achieving a LCD which provides more natural visibility by correcting the unnatural brightness distribution relative to viewing angles caused by the OCB liquid crystal mode.

Fourth Embodiment

The fourth embodiment of the invention is associated with another example of the configuration of the image display apparatus capable of providing an improved brightness distribution with respect to viewing angles.

Figure 7:
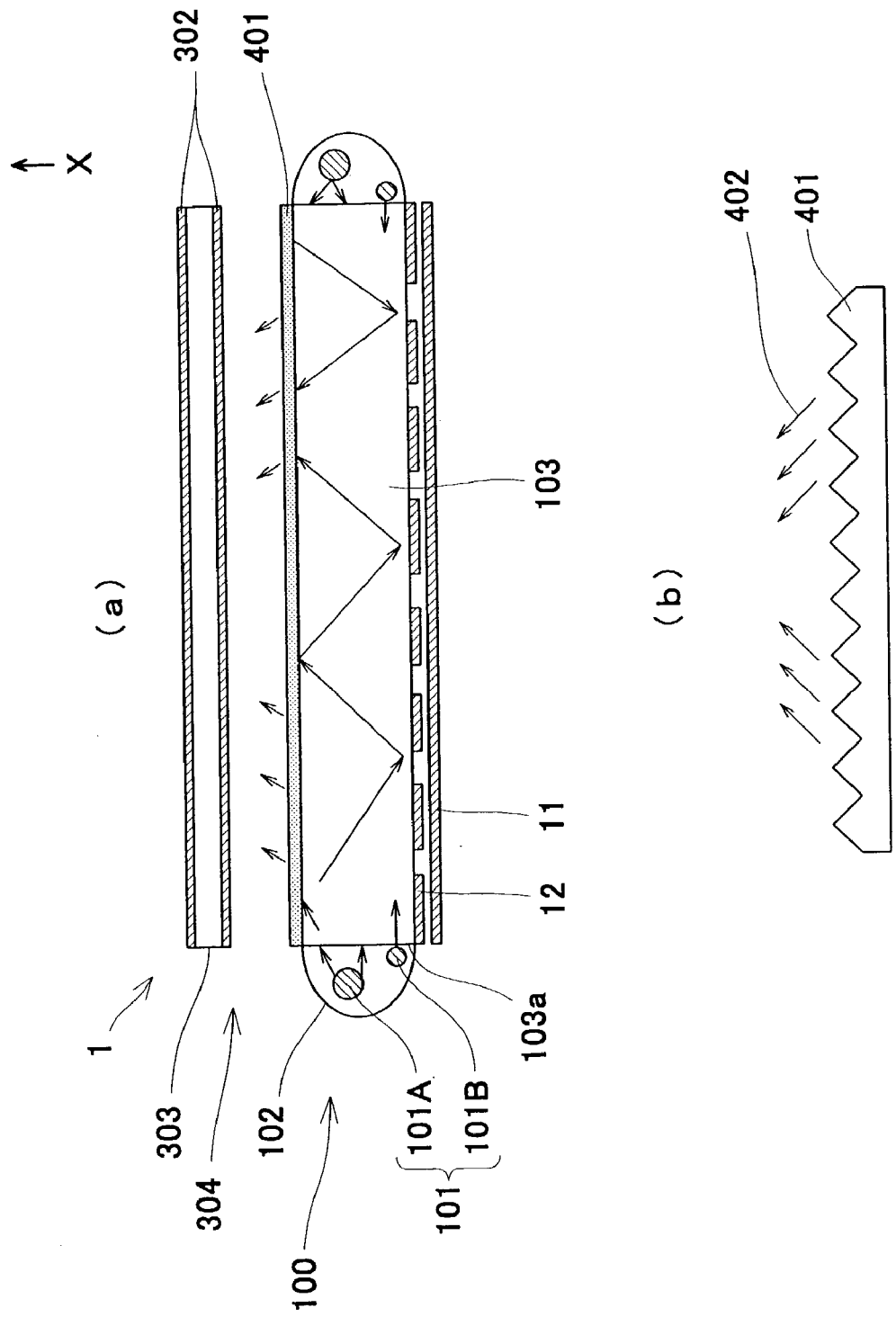

FIGS. 7(a) and 7(b) show the configuration and function of the image display apparatus of the fourth embodiment, FIG. 7(a) being a sectional view diagrammatically illustrating the configuration of the image display apparatus whereas FIG. 7(b) illustrates the function of a prism sheet incorporated in the image display apparatus shown in FIG. 7(a). In FIG. 7, the same reference numerals as in FIG. 4 designate the same or equivalent parts.

As shown in FIGS. 7(a) and 7(b), the fourth embodiment is similar to the third embodiment except that the fourth embodiment uses a prism sheet 401 in place of the scattering anisotropic film of the third embodiment.

The prism sheet 401 is designed to have an irregular main face in the form of triangular waves whereas the other main face is flat. The cross sections of the prism sheet 401 are uniform in a direction perpendicular to the cross section shown in FIG. 7(b), that is, a direction perpendicular to the direction in which the triangular wave portion extends. With this arrangement, the light beams coming from the flat main face are concentrated on the center to leave from the triangular main face (402). Such a prism sheet 401 is placed on the upper face of the optical waveguide 103 with its flat main face being in contact, and the direction in which the triangular wave portion extends being coincident with a direction perpendicular to the rubbing direction of the liquid crystal cell 303 (lateral direction of the screen).

With this arrangement, the viewing angle—transmittance characteristic of the LCD element 304 which varies so as to have peaks at ±60 degrees is offset by the characteristic of the prism sheet 401 which transmits light beams coming from the upper face of the optical waveguide 103 such that they are collectively directed to the center of the screen. Therefore, the change of the brightness relative to viewing angles of the LCD 1 is substantially similar to the viewing angle—brightness curve shown in FIG. 6(c). As a result, the present embodiment enables a LCD which provides natural visibility by correcting the unnatural brightness distribution with respect to viewing angles of the OCB liquid crystal mode.

There has been conventionally proposed a LCD configuration in which a prism sheet is placed on the upper face of the optical waveguide such that the extending direction of its triangular wave portion is coincident with a vertical direction of the screen of the liquid crystal cell. However, the light transmittance distribution having two peaks with respect to viewing angles in the liquid crystal cell of the OCB liquid crystal mode is a phenomenon which is attributable to the alignment of the liquid crystal molecules of the liquid crystal and seen only in a direction perpendicular to the alignment direction (rubbing direction), that is, the direction (lateral direction of the screen). The invention is intended for achievement of a LCD in which the above phenomenon is offset by the characteristics of the prism sheet which concentrates transmitted lights on the center so that a brightness distribution gently varying with respect to viewing angles can be ensured. On the other hand, the prior art is not the OCB liquid crystal mode as far as the inventors know and the arrangement of the prism sheet in relation to the screen is opposite to that of the invention. Therefore, the invention should be distinctly distinguished from the prior art.

Although the backlights of the edge light structure have been described in the third and fourth embodiments, the configuration of the backlight is not limited to this type but may be of the upright type.

In the third and fourth embodiments, the configuration of the LCD is not limited to those shown in FIGS. 4 and 7, but other modifications are possible. For example, the scattering anisotropic film 301 and the prism sheet 401 may be placed on the reflecting face of the reflecting member located under the optical waveguide 103. In addition, as the configuration of the light sources 104 and the optical waveguide 103, the structure having oblique end faces such as described in the first embodiment may be employed. It is apparent that these arrangements may be further improved or modified.

Fifth Embodiment

The fifth embodiment exemplifies a liquid crystal monitor, liquid crystal television and liquid crystal data terminal unit which are capable of providing increased brightness and improved viewing angle brightness.

Figure 8:
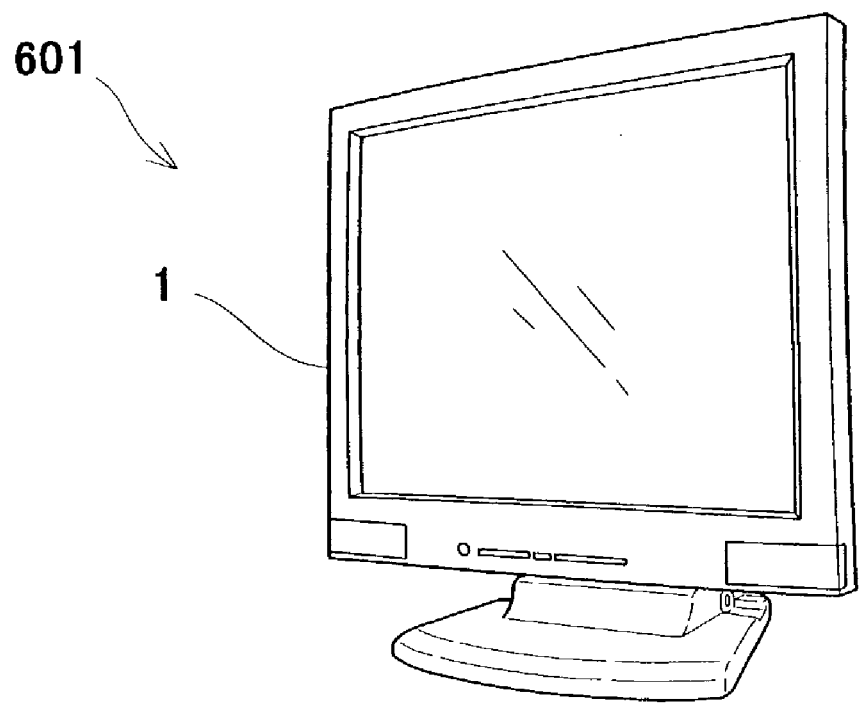
FIG. 8 is an outside view showing a structure of a liquid crystal monitor according to a fifth embodiment of the invention.

FIG. 8 is an outside view showing a structure of the liquid crystal monitor according to the fifth embodiment of the invention. Referring FIG. 8 in conjunction with FIG. 2, the liquid crystal monitor 601 comprises a display unit composed of the LCD 1 of the first embodiment and a signal processing unit (not shown) for processing monitor signals input from outside and is designed such that monitor picture signals released from the signal processing unit are input to a controller 22 of the LCD 1 as the picture signals 25. This arrangement enables a liquid crystal monitor having increased brightness.

Herein, a LCD having the backlight 100 of the second embodiment may be used as the LCD of the monitor of this embodiment, which also makes it possible to provide a liquid crystal monitor increased in brightness like the above case.

The LCD 1 of the third and fourth embodiments may be used as the LCD of the monitor of this embodiment, whereby a liquid crystal monitor improved in viewing angle brightness can be achieved.

Figure 9:
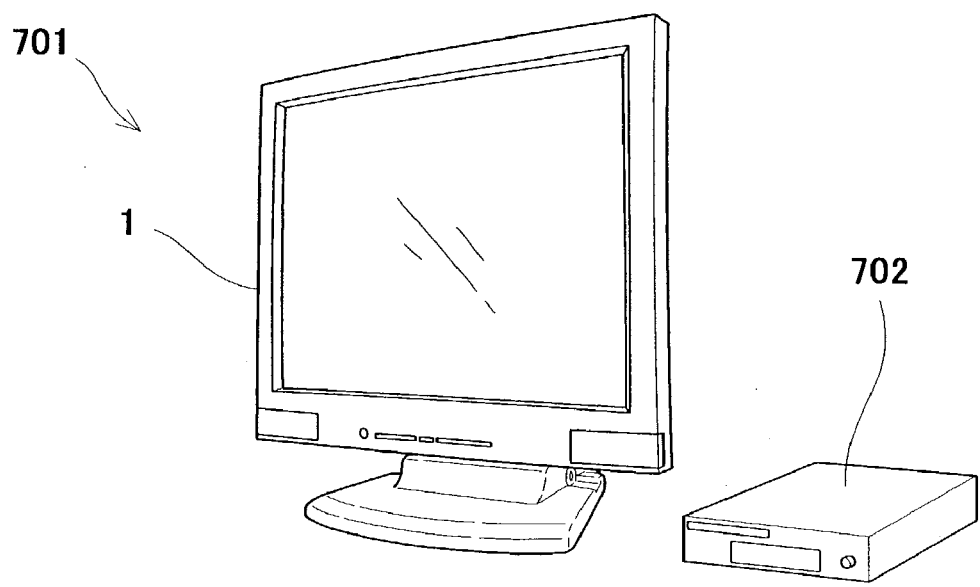
FIG. 9 is an outside view showing a structure of a liquid crystal television according to the fifth embodiment of the invention.
Figure 10:
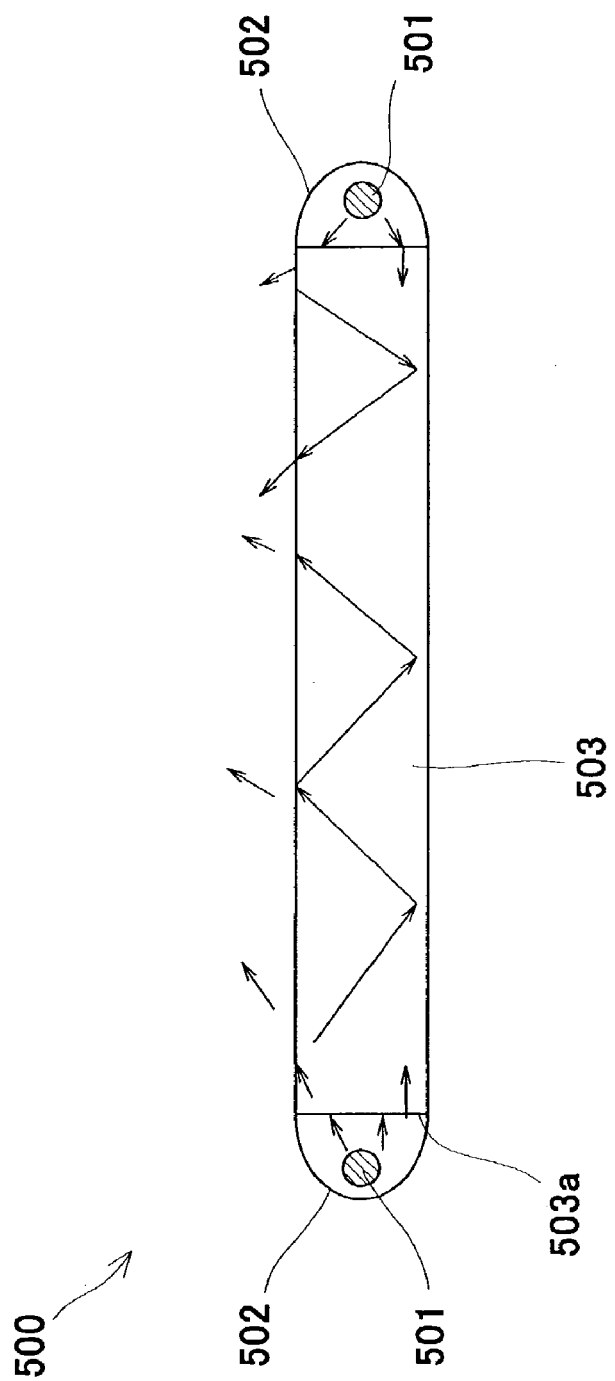
FIG. 10 is a sectional view showing a structure of a conventional edge light type backlight.

FIG. 9 is an outside view showing a structure of the liquid crystal television of the present embodiment. Referring to FIG. 9 in conjunction with FIG. 2, a liquid crystal television 701 comprises a display unit composed of the LCD 1 of the first embodiment and a tuner 702 for selecting a channel for TV broadcast signals input from outside, and is designed such that the TV broadcast signals of the channel selected by the tuner 702 are input to the controller 22 of the LCD 1 as the picture signals 25. It should be noted that the wiring between the LCD 1 and the tuner 702 is omitted from FIG. 9. With this arrangement, a liquid crystal television having increased brightness can be obtained.

A LCD having the backlight 100 of the second embodiment may be used as the LCD of the television of the present embodiment, which makes it possible to provide a liquid crystal television increased in brightness like the above case.

It is also possible to use the LCD 1 of the third and second embodiments as the LCD of the television of the present embodiment, and in this case, a liquid crystal television having improved viewing angle brightness can be achieved.

The liquid crystal data terminal unit of the present embodiment is formed by modifying the above-described liquid crystal television 701 such that a two-way transmission means for transmitting and receiving communication data is used instead of the tuner 702 and image signals including required data output from the two-way transmission means are input to the controller 22 as the picture signals 25. With this arrangement, a liquid crystal data terminal unit having increased brightness can be obtained.

A LCD having the backlight 100 of the second embodiment may be used as the LCD of the terminal unit of the present embodiment, which makes it possible to provide a liquid crystal data terminal unit increased in brightness like the above case. In addition, the LCD 1 of the third and fourth embodiments may be used as the LCD of the terminal unit of the present embodiment, thereby achieving a liquid crystal data terminal unit improved in viewing angle brightness.

While the first to fifth embodiments have been described with a liquid crystal element serving as one example of the image display element and a LCD element as one example of the image display apparatus, the invention is not limited to this.

Numerous modifications and alternative embodiments of the invention will be apparent to those skilled in the art in view of the foregoing description. Accordingly, the description is to be construed as illustrative only, and is provided for the purpose of teaching those skilled in the art the best mode of carrying out the invention. The details of the structure and/or function maybe varied substantially without departing from the spirit of the invention.

INDUSTRIAL APPLICABILITY

The liquid crystal television of the invention is well adapted for use as a thin-model television for consumer or industrial use.

The liquid crystal monitor of the invention is well adapted for use as a personal computer or various types of measuring devices or the like which require a thin display unit.

The liquid crystal data terminal unit of the invention is suited for use as a terminal unit for data communication network which requires a thin display unit.

The image display apparatus of the invention is suited for use as the above-described liquid crystal television, liquid crystal monitor or liquid crystal data terminal unit.

The lighting system of the invention is suited for use as a backlight for the above-described LCDs.

What is claimed is:

1. An image display apparatus comprising a lighting system including an optical waveguide designed to allow light entering through its end faces to go out through one of its main faces; and light sources disposed alongside the end faces of the optical waveguide respectively, for emitting light so as to be incident on the end faces; a LCD element for displaying images by allowing a liquid crystal layer which constitutes a screen to transmit the light emitted from the lighting system with varied transmittance of the liquid crystal layer, the LCD element having a pair of substrates opposed to each other and the liquid crystal layer interposed therebetween; and actuating means for varying the transmittance of the liquid crystal layer according to image signals, wherein the LCD element is designed such that when an angle of view with respect to a specified direction of the screen varies, provided that the LCD element is in a white display mode entirely, the transmittance of the liquid crystal layer varies so as to have peak values at viewing angles other than viewing angles in the vicinity of 0 degree, wherein each light source includes a plurality of elongated arc tubes which have different girths and are placed alongside their associated end face of the optical waveguide; and a reflecting member for reflecting light coming from the plurality of arc tubes to the associated end face of the optical waveguide, wherein the thinnest one of the plurality of arc tubes is disposed at a position closer to the associated end face than others, the end faces of the optical waveguide are flat faces perpendicular to the main faces of the optical waveguide, and the plurality of arc tubes are disposed so as not to overlap with one another when viewed from a direction perpendicular to the associated end face, and wherein the lighting system is designed to emit the light to the LCD element such that intensities of light beams emitted in directions of the viewing angles in the vicinity of 0 degree are higher than intensities of light beams emitted in directions of the viewing angles at which the transmittance of the liquid crystal layer has a peak value.

2. The image display apparatus according to claim 1, wherein when the angle of view varies with respect to said specified direction of the screen, brightness has its peak value at a viewing angle of substantially 0 degree.

3. The image display apparatus according to claim 2, wherein by scattering light beams which have been emitted in a certain direction, the intensities of light beams emitted in the directions of the viewing angles in the vicinity of 0 degree are made to be higher than the intensities of light beams emitted in the directions of the viewing angles at which the transmittance has a peak value.

4. The image display apparatus according to claim 3, wherein the lighting system performs the aforesaid scattering by use of a scattering anisotropic film which scatters light beams coming from angles within a specified range while transmitting light beams coming from other angles than the angles within the specified range.

5. The image display apparatus according to claim 2, wherein the lighting system is designed such that outgoing light beams are collected in the directions of the viewing angles in the vicinity of 0 degree, thereby making the intensities of light beams going out in said directions higher than the intensities of light beams going out in the directions of the viewing angles at which the transmittance has a peak value.

6. The image display apparatus according to claim 5, wherein the lighting system is designed such that said light condensation is carried out by use of a prism sheet for collecting incoming light to send in a certain direction.

7. The image display apparatus according to claim 6, wherein the LCD element is designed such that the transmittance varies so as to have peak values within the viewing angle range of from minus 60 degrees to minus 30 degrees and within the viewing angle range of plus 30 degrees to plus 60 degrees.

8. The image display apparatus according to claim 1, wherein the alignment direction of liquid crystal molecules in the liquid crystal layer of the LCD element is asymmetrical with respect to a vertical direction and lateral direction of the screen.

9. The image display apparatus according to claim 1, wherein an OCB mode LCD element is used as said LCD element.

10. The image display apparatus according to claim 9, wherein said specified direction of the screen is perpendicular to a rubbing direction for aligning the liquid crystal molecules of the liquid crystal layer.

11. The image display apparatus according to claim 1, wherein said specified direction is a lateral direction of the screen.

12. A liquid crystal television comprising the image display apparatus described in claim 1 and a tuner for selecting a channel of TV broadcast signals, wherein the TV picture signals corresponding to the channel which has been selected by the tuner are input to the actuating means of the image display apparatus as the image signals.

13. A liquid crystal monitor comprising the image display apparatus described in claim 1 and a signal processing unit for processing monitor signals, wherein monitor picture signals output from the signal processing unit are input to the actuating means of the image display apparatus as the image signals.

14. A liquid crystal data terminal unit comprising the image display apparatus described in claim 1 and data receiving means for receiving communication data, wherein image signals including required data output from the data receiving means are input to the actuating means of the image display apparatus as the image signals.

15. A lighting system comprising an optical waveguide designed to allow light entering through its end faces to go out through one of its main faces; and light sources disposed alongside the end faces of the optical waveguide respectively, for emitting light so as to be incident on the end faces, wherein each light source includes a plurality of elongated arc tubes which have different girths and are placed alongside their associated end face of the optical waveguide; and a reflecting member for reflecting light coming from the plurality of arc tubes to the associated end face of the optical waveguide, and wherein the thinnest one of the plurality of arc tubes is disposed at a position closer to the associated end face than others, wherein the end faces of the optical waveguide are flat faces perpendicular to the main faces of the optical waveguide, and wherein the plurality of arc tubes are disposed so as not to overlap with one another when viewed from a direction perpendicular to the associated end face.

16. An image display apparatus comprising:

a lighting system comprising an optical waveguide designed to allow light entering through its end faces to go out through one of its main faces, and light sources disposed alongside the end faces of the optical waveguide respectively, for emitting light so as to be incident on the end faces, wherein each light source includes a plurality of elongated arc tubes which have different girths and are placed alongside their associated end face of the optical waveguide and a reflecting member for reflecting light coming from the plurality of arc tubes to the associated end face of the optical waveguide and wherein the thinnest one of the plurality of arc tubes is disposed at a position closer to the associated end face than others, wherein the end faces of the optical waveguide are flat faces perpendicular to the main faces of the optical waveguide, and wherein the plurality of arc tubes are disposed so as not to overlap with one another when viewed from a direction perpendicular to the associated end face;

an image display element for displaying images by allowing an optical modulator which constitutes a screen to transmit light coming from the lighting system with varied transmittance; and actuating means for varying the transmittance of the image display element according to image signals.

17. The image display apparatus according to claim 16, wherein the image display element consists of an LCD element which uses a liquid crystal layer as the optical modulator, whereby an LCD is constructed.

18. A liquid crystal television comprising the image display apparatus described in claim 16 and a tuner for selecting a channel of TV broad cast signals, wherein the image display element of the image display apparatus consists of an LCD element which uses a liquid crystal layer as the optical modulator and wherein the TV picture signals corresponding to the channel which has been selected by the tuner are input to the actuating means of the image display apparatus as the image signals.

19. A liquid crystal monitor comprising the image display apparatus described in claim 16 and a signal processing unit for processing monitor signals, wherein the image display element of the image display apparatus consists of an LCD element which uses a liquid crystal layer as the optical modulator and wherein monitor picture signals output from the signal processing unit are input to the actuating means of the image display apparatus as the image signals.

20. A liquid crystal data terminal unit comprising the image display apparatus described in claim 16 and data receiving means for receiving communication data, wherein the image display element of the image display apparatus consists of an LCD element which uses a liquid crystal layer as the optical modulator and wherein image signals including desired data output from the data receiving means are input to the actuating means of the image display apparatus as the image signals.

* * * * *